United States Patent [19]

Withers

[11] Patent Number: 5,574,218

[45] Date of Patent: Nov. 12, 1996

[54] DETERMINING THE LENGTH AND AZIMUTH OF FRACTURES IN EARTH FORMATIONS

[75] Inventor: Robert J. Withers, Plano, Tex.

[73] Assignee: Atlantic Richfield Company, Los Angeles, Calif.

[21] Appl. No.: 570,147

[22] Filed: Dec. 11, 1995

[51] Int. Cl.[6] .................................................. E21B 47/00
[52] U.S. Cl. .............................. 73/152.02; 367/37
[58] Field of Search ................................. 367/14, 37, 40, 367/75; 73/151, 151.5

[56] References Cited

U.S. PATENT DOCUMENTS

| | | | |
|---|---|---|---|
| 3,739,871 | 6/1973 | Bailey | 367/14 |
| 4,167,213 | 9/1979 | Stolz et al. | 166/251 |
| 4,280,200 | 7/1981 | Silverman | 367/14 |
| 4,282,587 | 8/1981 | Silverman | 367/14 |
| 4,432,078 | 2/1984 | Silverman | 367/37 |
| 4,524,434 | 6/1985 | Silverman | 367/37 |
| 4,890,264 | 12/1989 | Crews et al. | 367/45 |
| 5,241,513 | 8/1993 | Kerekes et al. | 367/39 |

OTHER PUBLICATIONS

"Active and passive imaging of hydraulic fractures", Wills et al, Geophysics, Jul., 1992 pp. 15–22.
"The Application of High Frequency Seismic Monitoring Methods for the Mapping of Grout Injections", E. L. Majer. Int. J. Rock Mech, Min. Sci. & Geomech, Abstr vol. 26, No. 314, pp. 249–256, 1989.

*Primary Examiner*—Richard Chilcot
*Assistant Examiner*—Ronald Biegel
*Attorney, Agent, or Firm*—Drude Faulconer

[57] ABSTRACT

A method for determining the approximately length and the azimuth of a hydraulic fracture after it has been formed in a subterranean formation without requiring the use of dedicated monitor wells or the need for positioning sensors at subsurface locations. Basically, the present method involves the comparison of routine, seismic surveys carried out at the surface before and after the fracture is formed to thereby determine the approximate length and azimuth of the fracture.

8 Claims, 2 Drawing Sheets

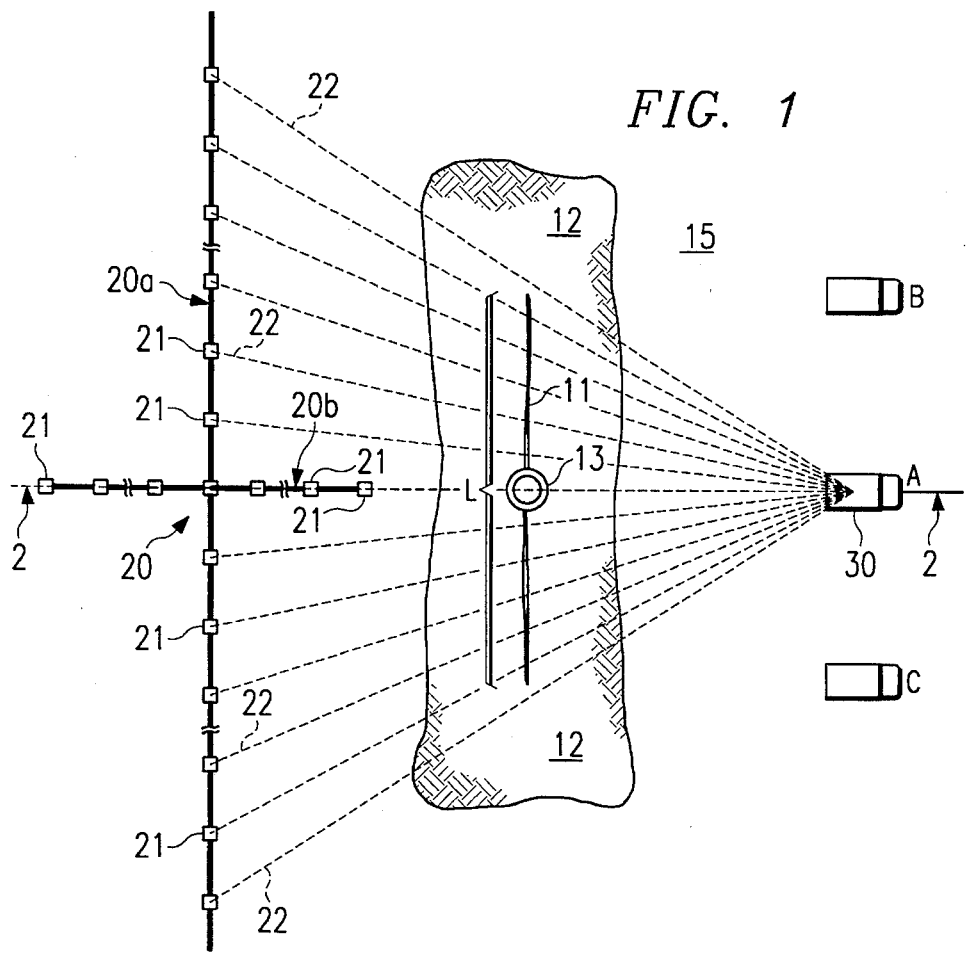

DETERMINING THE LENGTH AND AZIMUTH OF FRACTURES IN EARTH FORMATIONS

DESCRIPTION

1. Technical Field

The present invention relates to determining the length and azimuth of a fracture(s) in an earth formation and in one of its aspects relates to a method for determining the length and the direction (i.e. azimuth) which a fracture extends into a formation away from an injection well by using seismic surveys carried out on the surface.

2. Background Art

In the production of hydrocarbons or the like from subterranean formations, it is common to "hydraulically fracture" a producing formation to increase its permeability, hence the productivity from the formation. In a typical hydraulic fracturing operation, a fracturing fluid (e.g. a liquid such as a gel) is injected under pressure into the formation through an injection well to form a vertical fracture which extends along a vertical plane into the formation for a distance (i.e. length) from either side of the injection well This fluid may carry entrained, particulate material such as sand or gravel (commonly called "props") which is deposited in the fracture as the fracture is formed to prop or hold the fracture open after the fracturing pressure is relaxed.

After carrying out such hydraulic fracturing operations, it is important to determine the extent (i.e. length) and the orientation (i.e. azimuth) of the fractures in order to properly "engineer" the production of hydrocarbons from the field during both primary and secondary recovery periods. That is, in the primary production of the formation, knowledge of the azimuth and the length of the fractures are vital considerations in properly locating and spacing production wells to maximize the production of the hydrocarbons from the fractured formation.

Likewise, knowing the relationship of the fractures to certain wells is vitally important in the secondary production of the formation wherein a drive fluid (e.g. water, gas, etc.) is injected into the formation through one or more injection wells and is flowed through the formation to thereby drive at least a part of the remaining hydrocarbons towards one or more production wells. If a fracture connects an injection well directly to a production well, the drive fluids will merely flow through the fracture and bypass most of remaining hydrocarbons.

There are at least two basic techniques for determining the extent and orientation of hydraulic fractures; i.e. (1) computer models based on known rock mechanics, etc. of the formation, and (2) direct measurement of the fractures as, or after, they are actually formed. Computer modelling of formations is complicated and normally reflect all of the known variables found in the specific formation to be fractured but does not include the unknown variables such as changes in lithology, faults, etc. Accordingly, in some instances, the fracture predictions, based on such modelling, may significantly vary with the fractures actually formed in the formation.

Methods for directly measuring fractures include (a) stress orientation techniques such as oriented core samples, temperature and tracer logs, impression packers, etc. and (b) fracture monitoring techniques such as microseismic monitoring from a injection well and/or spaced, monitor well(s), surface tiltmeters, and interwell seimic techniques such as shear-wave shadowing.

Unfortunately, the reliability of measurements taken by surface tiltmeters decrease as the depth of the fracture increases their use is restricted. Of the other known direct measurement techniques, only the seismic monitoring techniques provide any information as to what happens out in the formation away from the immediate vicinity of the injection wellbore. Such seismic techniques include those proposed for real-time monitoring of fractures as the fractures are being formed.

For example, an article entitled "Active and Passive Imaging of Hydraulic Fractures", by P. B. Willis et al, GEOPHYSICS: The Leading Edge of Exploration, July, 1992, describes a system for monitoring the growth of hydraulic fractures wherein the seismic events created within the formation during the fracturing operation are detected and measured by geophones positioned within one or more instrumented monitor wells. The measured signals are then processed and analyzed to produce the fracture profile within the formation as the fracture is being formed in the formation.

Still another system proposed for monitoring the location and extent of a fracture as it is being formed is disclosed and claimed in the present inventor's co-pending, commonly-assigned U.S. patent application Ser. No. 08/196,621, filed Feb. 14, 1994, wherein a plurality of sensors, e.g. geophones, are positioned in an injection well and/or spaced monitor well(s) and are adapted to receive acoustical signals which are generated as the hydraulic fracture is being formed.

This type of real-time monitoring of fractures show real promise. However, in carrying out these techniques, the sensors must be positioned downhole in the appropriate wells which, in turn, is likely to require dedicated, monitor wells to collect the necessary data. The drilling and completion of such wells, of course, adds significantly to the costs of the fracture operation and in some instances may make such operations financially prohibitive. Accordingly, there is a need for a simple and relatively low cost method for quickly determining the approximate length and azimuth of a hydraulic fracture as it exists in a formation.

SUMMARY OF THE INVENTION

The present invention provides a method for determining the approximate length and azimuth of a hydraulic fracture in a subterranean formation without positioning sensors at any subsurface locations, thereby eliminating the need for expensive, dedicated monitor wells. Basically, the present method determines the approximate length and azimuth of the fracture by simply comparing substantially routine, seismic surveys which are carried out from the surface before and after the fracture is formed. That is, a first seismic survey is carried out from the surface in the vicinity of the injection well which is to be used in fracturing the formation before and after the fracture is formed. While the results may not be exact, they will nevertherless provide an realistic approximation of the length and location of the fracture at relatively low costs.

More specifically, in carrying out the present invention, a typical seismic source (e.g. air gun(s); vibrator(s); explosive(s); shear sources, etc.) is positioned at a first position on one side of an injection well and an array comprised of a plurality of acoustical-energy sensors (e.g. geophones) is positioned on the the opposite side of the injection well.

Preferably, both the seismic source and the array are positioned at substantially equal distances from said injection well with this distance being equal to approximately one-half of the depth at which the fracture is to be formed.

The array comprises a first string of a plurality of acoustical energy sensors which are positioned substantially parallel to the vertical plane of the expected hydraulic fracture and a second string of a plurality of acoustical energy sensors which cross said first string and which is positioned substantially perpendicular to the vertical plane of the expected hydraulic fracture. When the seismic source is in the first position with respect to the injection well, the second string of acoustical energy sensors is substantially aligned with both the well and the seismic source.

As will be understood by those skilled in the art, the seismic source is activated to generate acoustical energy which passes downward in the earth where it is reflected back towards the surface from various subterranean layers as a series of acoustical signals. These reflected signals are received by the sensors in the array and both the travel time and the amplitude are measured and processed in accordance with known techniques to produce a first seimic survey (i.e. seismic traces which provide a "picture" of the subsurface terrain around the injection well). Also, the seismic source can be moved to at least one additional position (second position) on the same side of the injection well where an additional seismic survey is carried out to serve as an further reference in the determining the length and azimuth of the fracture.

A fracturing fluid is then pumped through the injection well and into said formation to initiate and propagate a hydraulic fracture therein. After the fracture is formed and while the fracture is still open and under pressure, another routine seismic survey is carried out from the surface in the same manner as before. The corresponding reflected signals from the respective surveys are then correlated using well known techniques and by examining the differences in the seismic energy (e.g. time delays, changes in velocity and amplitude) passing through the vicinity of the fracture when closed and open, the signals, the length and azimuth with respect to the injection well can be determined.

If the initial analyses of seismic surveys indicate that the fracture may have strayed significantly from the expected azimuth (i.e. parallel to the first string of sensors), the seismic source may be again repositioned to its second position and an seismic survey is carried out from the second position while the hydraulic fracture is open and under pressure. This survey is compared to the survey taken at the second position before the fracture was formed to further and better define the length and azimuth of the skewed hydraulic fracture.

Again, by using only surface, standard seismic surveys to determine the approximate length and azimuth of a hydraulic fracture, the costs of such operations are significantly reduced.

BRIEF DESCRIPTION OF THE DRAWINGS

The actual construction, operation, and apparent advantages of the present invention will be better understood by referring to the drawings which are not necessarily to scale and in which like numerals identify like parts and in which:

FIG. 1 is a plan view, partly broken away, showing typical raypaths of signals emanating from a seismic source which is positioned on one side of an injection well as the signals are reflected off a subterranean fracture and are received by an array of acoustical sensors positioned on the other side of the well;

FIG. 2 is an idealized, sectional view, taken along line 2—2 of FIG. 1; and

BEST KNOWN MODE FOR CARRYING OUT THE INVENTION

Figure 3:
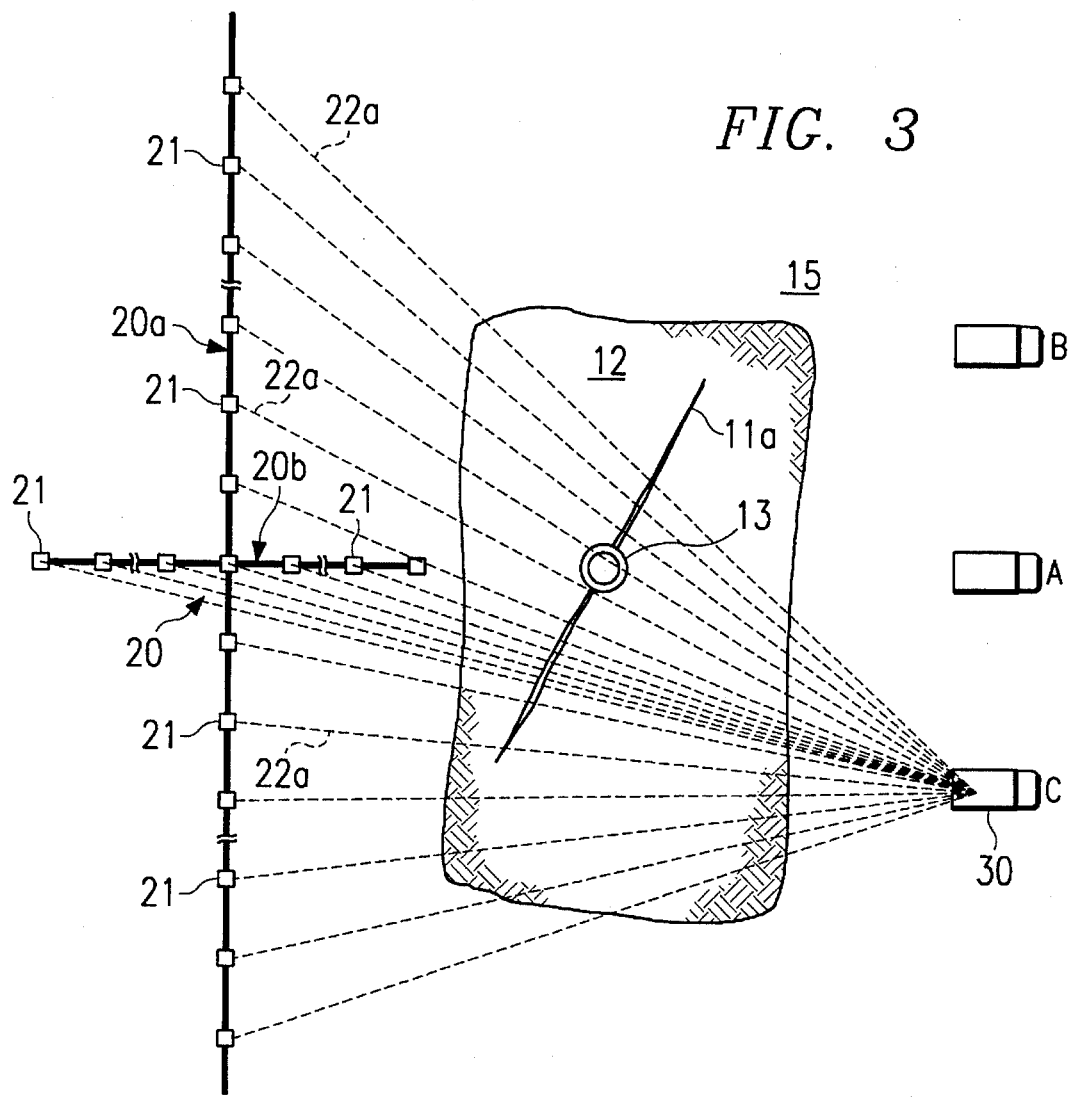
FIG. 3 is a plan view, similar to FIG. 1, disclosing a second seismic operation being carried out with the seismic source being moved to a second position.

Referring more particularly to the drawings, FIG. 1 is a plan or top view showing the surface layout for a seismic system used in accordance with the present invention for determining the approximate extent and azimuth of a fracture 11 which is to be formed in subterranean formation 12 from an injection well 13. As shown in FIG. 2, well 13 is drilled through formation 12 and is cased with casing 14 which, in turn, extends from the surface 15 through formation 12 with perforations 16 therein adjacent the formation 12 to be fractured. Of course, casing 14 may terminate above fracture zone which, in turn, may be completed "open hole", as will be understood by those skilled in the art.

In accordance with the present invention, a sensor array 20 is positioned on one side of injection well 13. Preferably, array 20 is comprised of two strings of a plurality of sensors 21 which cross each other at approximately 90° and at a point from well 13 which is equal to approximately one-half depth of formation 12. A first string 20a of sensors 21 lies substantially parallel to the direction (i.e. azimuth) that fracture 11 (FIG. 2) expected to take as it is formed in formation 12; this anticipated direction of the fracture being determined from well logs, core samples, known faulting, etc. as will be understood by those skilled in this art. The second string 20b of sensors 15 lies substantially perpendicular to string 20a and hence, perpendicular to the expected azimuth of fracture 11.

Sensors 21 may be selected from any well known acoustic-energy sensing devices (e.g. geophones) of the type typically used in surface or subsurface seismic surveys. Such devices generate a signal in response to received acoustical energy and then transmit the generated signal on for recording or further processing. For example, sensor 21 may be a geophone unit (not shown) which is comprised of three orthogonally-arranged detectors (e.g. 30 Hz broad band type detector such as is commercially-available as a type SM-11 from SENSOR, Houston, Tex.) wherein the detectors are oriented to provide one vertical and two horizontal energy-sensing and signal-transmitting channels.

Further, seismic sensor array 20 may also include means for cancelling surface noise signals which may be caused by wind, machinery, etc., thereby improving the quality of the received signals. One such system is disclosed in U.S. Pat. No. 4,890,264, which is incorporated herein by reference.

A seismic source 30 is positioned on the opposite side of injection well 13 at a first position A which, again, is equal to approximately one-half the depth of formation 12. Source 30, when in position "A", is substantially aligned with both well 13 and array string 20b. Source 30 may selected from any acoustically-generating device of those types typically used in known seismic operations for imparting acoustical energy into the earth. For example, source 30 may be a compressional wave ("P-wave") and/or shear wave ("S-wave") generator (e.a. "air gun(s)", vibrator(s), explosives, shear source, etc.), as will be understood in the art.

In carrying out the present invention, a first or reference seismic survey is carried out before formation 12 is fractured. That is, source 30 is positioned at point "A" (FIG. 1) which is substantially in line with well 13 and string 20b of array 20 and is actuated to impart acoustical energy signals into the ground. As will be understood by those skilled in the art, these signals follow raypaths 22 (only some shown) and pass downwardly in the earth where they are reflected or "bounced" off various layers (reflective planes) therein. These reflected signals travel upward to the surface where they are detected and received by the various sensors 21. By using the travel times and/or amplitudes of the signals received at the various sensors 21, the depths and types of the various reflective layers can be determined.

If logs, cores, and other known geological information indicate that the azimuth of fracture 11 is likely to vary or skew away from the predicted direction, additional seismic surveys should also be carried from additional points, e.g. source 30 can be positioned at points "B" and "C" (FIG. 1), to provide additional reference surveys of the subsurface geology for a purpose to be described below.

Once the reference seismic surveys have been completed, formation 12 can then be fractured by pumping a fracturing fluid down the injection well 13 and out into the formation 12 through perforations 14. As will be understood by those skilled in the art, the fracturing fluid which will normally initiate and propagate a fracture 11 (vertical at greater depths and horizontal at lesser depths) into formation 12 on either side of well 13. As fracture 11 is being formed, the fracture surfaces will be held apart (e.g. one half-inch wide) by the pressure of the fracturing fluid therein. The fracture will remain open until this pressure is relieved whereupon leakoff of the fracturing fluid will cause the fracture closes.

In accordance with the present invention, a second seismic survey is carried out while fracture 11 is open and still under pressure. The survey is carried out in the same manner as described above. However, as known, the S-waves of the acoustical, seismic signals will not pass through liquids, e.g. the fracturing fluid in open fracture 11. Accordingly, by recording the S-waves signals at each sensors 21 and comparing or correlating these signals to those S-wave signals received at the same respective sensors during the reference survey (e.g. by "shear wave shadowing"), the approximate length and the azimuth of fracture 11 in formation 12 can be determined with reasonable accuracy. For a good discussion of "shear wave shadowing", see "Active and Passive Imaging of Hydraulic Fractures", by P. B. Willis et al, GEOPHYSICS: The Leading Edge of Exploration, July, 1992.

Also, as the fracturing operation is being carried out, an excess pressure zone (dotted line "Z" in FIG. 2) is established in formation 12 around well 13. This zone effects the velocity of the compressional waves, i.e. P-waves, as they pass therethrough, which, in turn, changes both the travel time and amplitude of these signals. The amplitude of the P-waves varies due to the energy-partitioning at the boundry of zone Z as described by the well-known Zoeppritz equations. Accordingly, the differences between the P-waves received from formation 12 prior to and after the fracturing operation can be analyzed to determine or confirm the length and/or azimuth of fracture 11.

Where the comparison of surveys taken with source 30 at point A (FIG. 1) indicates that fracture 11 has not followed its expected direction (i.e. one which is substantially parallel to string 20a of array 20), it may be desirable to move source 30 or use alternate sources at points B and/or C to carry out additional seismic surveys from these points while the fracture 11a (FIG. 2) is still open and under pressure. It will be seen that the raypaths 22a followed by the signals generated at point B (FIG. 2) and/or point C (not shown) will differ substantially from the raypaths 22 generated from point A. Accordingly, by comparing the signals (e.g. arrival times, amplitudes, etc. of the S-waves and/or P-waves) received at each of the sensors 21 along strings 20a and 20b with the respective signals from the reference surveys taken at point B and/or C before the fracture was formed, a better approximation of both the length and the azimuth of the skewed fracture 11a can be made.

What is claimed is:

1. A method for determining the approximate length and azimuth of a hydraulic fracture within a subterranean formation, said method comprising:

carrying out a seismic survey of the formation from a first position on the surface before forming said hydraulic fracture in said formation;

pumping a fracturing fluid through the wellbore of an injection well into said formation to initiate and propagate said hydraulic fracture therein;

carrying out another seismic survey of the formation from the surface after said hydraulic fracture has been formed in said formation; and comparing said seismic surveys to determine the approximate length and azimuth of said hydraulic fracture;

wherein the steps of carrying out said seismic surveys before and after the forming of said hydraulic fracture comprise:

positioning a seismic source at said first position on one side of said injection well;

positioning an array of acoustical-energy sensors on the the opposite side of said injection;

activating said seismic source to generate and impart acoustical energy signals into the earth; and receiving said acoustical energy signals at said array after said signals have passed through the earth.

2. The method of claim 1 wherein said another seismic survey is carried out while said fracture is open under pressure.

3. The method of claim 1 wherein both said seismic source and said array are positioned at substantially equal distances from said injection well.

4. The method of claim 3 wherein said equal distance from said injection is equal to approximately one-half the depth at which said hydraulic fracture is formed.

5. The method of claim 1 wherein said array comprises:

a first string of spaced acoustical energy sensors lying substantially parallel to the vertical plane of said hydraulic fracture; and a second string of spaced acoustical energy sensors crossing said first string of acoustical energy sensors and lying substantially perpendicular to said vertical plane of said hydraulic fracture.

6. The method of claim 5 wherein said second string of acoustical energy sensors is substantially aligned with said injection well and said seismic source.

7. The method of claim 5 wherein each of said plurality of acoustical-energy sensors comprises:

a geophone.

8. The method of claim 1 including:

carrying out at least one additional seismic survey before said hydraulic fracture is formed in said formation by repositioning said seismic source to a second position on said one side of said injection well;

carrying out at least one additional seismic survey after said hydraulic fracture has been formed in said formation while said seismic source is at said second position; and comparing said respective at least one additional seismic surveys to further define the length and azimuth of said hydraulic fracture.

* * * * *